United States Patent
Yasuda et al.

(10) Patent No.: US 8,154,890 B2
(45) Date of Patent: Apr. 10, 2012

(54) INVERTER APPARATUS WITH CONTROL AND VOLTAGE-SAG CIRCUITRY TO QUICKLY RESTART WHEN RECOVERING FROM A MINI POWER FAILURE

(75) Inventors: Satoshi Yasuda, Tokyo (JP); Hitoshi Teramoto, Tokyo (JP); Michihiro Tadokoro, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 460 days.

(21) Appl. No.: 12/484,474

(22) Filed: Jun. 15, 2009

(65) Prior Publication Data

US 2010/0149844 A1    Jun. 17, 2010

(30) Foreign Application Priority Data

Dec. 16, 2008   (JP) ................................ 2008-320164

(51) Int. Cl.
*H02J 3/00* (2006.01)
*H02M 5/45* (2006.01)

(52) U.S. Cl. ........................................... 363/34; 363/37

(58) Field of Classification Search ................ 363/34, 363/37, 56.03, 56.05, 95, 97, 98
See application file for complete search history.

(56) References Cited

U.S. PATENT DOCUMENTS

| 4,331,994 | A | * | 5/1982 | Wirth ............................... 361/56 |
| 5,220,494 | A | * | 6/1993 | Leuthen ........................... 363/37 |
| 5,245,522 | A | * | 9/1993 | Kawaguchi et al. ............ 363/37 |
| 5,430,636 | A | * | 7/1995 | Kachi .............................. 363/58 |
| 2001/0026460 | A1 | * | 10/2001 | Ito et al. .......................... 363/34 |
| 2005/0099829 | A1 | * | 5/2005 | Wei et al. ........................ 363/34 |
| 2005/0169018 | A1 | * | 8/2005 | Hatai et al. ..................... 363/37 |
| 2008/0031019 | A1 | * | 2/2008 | Alexander ...................... 363/37 |
| 2008/0094864 | A1 | * | 4/2008 | Sekimoto et al. ............... 363/36 |
| 2009/0021963 | A1 | * | 1/2009 | Andresen et al. ............... 363/37 |
| 2010/0080022 | A1 | * | 4/2010 | Schmidt .......................... 363/53 |

FOREIGN PATENT DOCUMENTS

JP   2-269479 A   11/1990

* cited by examiner

*Primary Examiner* — Jeffrey Sterrett
*Assistant Examiner* — Gary Nash
(74) *Attorney, Agent, or Firm* — Buchanan Ingersoll & Rooney PC (57) ABSTRACT

An inverter apparatus converts a DC power of a capacitor charged via a rectifier circuit connected to a first AC power system into an AC power, and supplies the AC power to a second AC power system. The inverter apparatus includes a discharge circuit, a control circuit, a trigger circuit, a first voltage-sag detection circuit, a control power circuit, and a second voltage-sag detection circuit. When the second voltage-sag detection circuit detects a voltage sag of the control power circuit below a threshold, the trigger circuit generates a discharge command signal for causing the discharge circuit to discharge a charge from the capacitor.

6 Claims, 8 Drawing Sheets

INVERTER APPARATUS WITH CONTROL AND VOLTAGE-SAG CIRCUITRY TO QUICKLY RESTART WHEN RECOVERING FROM A MINI POWER FAILURE

BACKGROUND OF THE INVENTION

1. Field of the Invention

The present invention relates to an inverter apparatus.

2. Description of the Related Art

When a break or a voltage sag occurs in an alternate-current power system (hereinafter, "system-voltage sag or the like"), a conventional inverter apparatus causes each of switching elements of an inverter to turn off, thereby avoiding any abnormal current passing through the switching elements. However, even when giving a stop command signal to each of the switching elements, if a power voltage of a control circuit that controls the switching elements decreases, sometimes the control circuit cannot maintain the stop command signal, and an abnormal switching command may be output to the switching elements in some cases. For example, if an abnormal switching command that establishes a short circuit in an inverter main circuit is output to each of the switching elements of the main circuit, there is a possibility that an overcurrent based on a charge stored in a capacitor for a direct-current power circuit may pass through the switching elements.

On the other hand, an inverter apparatus disclosed in Japanese Patent Application Laid-open No. H2-269479 is configured to give a stop command signal to switching elements upon an occurrence of a system-voltage sag or the like based on a detection signal about the event that is detected, and to cause a discharge circuit to discharge a charge in the capacitor after the switching elements are turned to a steady OFF-state, and operation of an inverter is stopped. Accordingly, even if the power voltage of the control circuit decreases and the control circuit can no longer maintain the stop command, the charge stored in the capacitor does not pass through the switching elements as an overcurrent.

However, in the inverter circuit described above, because the charge stored in the capacitor is discharged when a system-voltage sag or the like occurs, the capacitor needs to be recharged when restarting the inverter apparatus. Consequently, when restarting the inverter apparatus, there is a problem that a charging time is required for storing a predetermined charge in the capacitor.

SUMMARY OF THE INVENTION

It is an object of the present invention to at least partially solve the problems in the conventional technology.

According to one aspect of the present invention, there is provided an inverter apparatus that converts a direct-current power of a capacitor that is charged via a rectifier circuit connected to a first alternate-current power system into an alternate-current power, and supplies the alternate-current power to a second alternate-current power system. The inverter apparatus includes a discharge circuit that discharges a charge from the capacitor; a control circuit that controls at least one of frequency and amplitude of the inverter output voltage; a trigger circuit that outputs a discharge command signal for causing the discharge circuit to discharge the charge from the capacitor; a first voltage-sag detection circuit that detects a voltage sag in the first alternate-current power system, and outputs a voltage-sag signal to the control circuit; a control power circuit that receives a power from either one of the first alternate-current power system and the capacitor, and supplies a power to the control circuit; and a second voltage-sag detection circuit that detects a voltage sag in the control power circuit. When the second voltage-sag detection circuit detects a voltage sag of the control power circuit below a predetermined value, the trigger circuit generates the discharge command signal.

Furthermore, according to another aspect of the present invention, there is provided an inverter apparatus that converts a direct-current power of a capacitor that is charged via a rectifier circuit connected to a first alternate-current power system into an alternate-current power, and supplies the alternate-current power to a second alternate-current power system. The inverter apparatus includes a discharge circuit that discharges a charge from the capacitor; a control circuit that controls at least one of frequency and amplitude of the inverter output voltage; a trigger circuit that outputs a discharge command signal for causing the discharge circuit to discharge the charge from the capacitor; a first voltage-sag detection circuit that detects a voltage sag in the first alternate-current power system, and outputs a voltage-sag signal to the control circuit; a control power circuit that receives a power from the first alternate-current power system, and supplies a power to the control circuit; and a second voltage-sag detection circuit that detects a voltage sag in the control power circuit. When the second voltage-sag detection circuit detects a voltage sag of the control power circuit below a predetermined value, the trigger circuit generates the discharge command signal.

Moreover, according to still another aspect of the present invention, there is provided an inverter apparatus that converts a direct-current power of a capacitor that is charged via a rectifier circuit connected to a first alternate-current power system into an alternate-current power, and supplies the alternate-current power to a second alternate-current power system. The inverter apparatus includes a discharge circuit that discharges a charge from the capacitor; a control circuit that controls at least one of frequency and amplitude of the inverter output voltage; a trigger circuit that outputs a discharge command signal for causing the discharge circuit to discharge the charge from the capacitor; a first voltage-sag detection circuit that detects a voltage sag in the first alternate-current power system, and outputs a voltage-sag signal to the control circuit; a control power circuit that receives a power from the first alternate-current power system and an alternate-current power system other than the second alternate-current power system, and supplies a power to the control circuit; and a second voltage-sag detection circuit that detects a voltage sag in the control power circuit. When the second voltage-sag detection circuit detects a voltage sag of the control power circuit below a predetermined value, the trigger circuit generates the discharge command signal.

Furthermore, according to still another aspect of the present invention, there is provided an inverter apparatus that converts a direct-current power of a capacitor that is charged via an inverter functioning as a rectifier circuit connected to an alternate-current power system into an alternate-current power, and supplies the alternate-current power to the alternate-current power system. The inverter apparatus includes a discharge circuit that discharges a charge from the capacitor; a control circuit that controls at least one of frequency and amplitude of the inverter output voltage; a trigger circuit that outputs a discharge command signal for causing the discharge circuit to discharge the charge from the capacitor; a first voltage-sag detection circuit that detects a voltage sag in the alternate-current power system, and outputs a voltage-sag signal to the control circuit; a control power circuit that receives a power from either one of the alternate-current power system and the capacitor, and supplies a power to the control circuit; and a second voltage-sag detection circuit that detects a voltage sag in the control power circuit. When the second voltage-sag detection circuit detects a voltage sag of the control power circuit below a predetermined value, the trigger circuit generates the discharge command signal.

Moreover, according to still another aspect of the present invention, there is provided an inverter apparatus that converts a direct-current of a capacitor that is charged via an inverter functioning as a rectifier circuit connected to an alternate-current power system into an alternate-current power, and supplies the alternate-current power to the alternate-current power system. The inverter apparatus includes a discharge circuit that discharges a charge from the capacitor; a control circuit that controls at least one of frequency and amplitude of the inverter output voltage; a trigger circuit that outputs a discharge command signal for causing the discharge circuit to discharge the charge from the capacitor; a first voltage-sag detection circuit that detects a voltage sag in the alternate-current power system, and outputs a voltage-sag signal to the control circuit; a control power circuit that receives a power from the alternate-current power system, and supplies a power to the control circuit; and a second voltage-sag detection circuit that detects a voltage sag in the control power circuit. When the second voltage-sag detection circuit detects a voltage sag of the control power circuit below a predetermined value, the trigger circuit generates the discharge command signal.

Furthermore, according to still another aspect of the present invention, there is provided an inverter apparatus that converts a direct-current power of a capacitor that is charged via an inverter functioning as a rectifier circuit connected to an alternate-current power system into an alternate-current power, and supplies the alternate-current power to the alternate-current power system. The inverter apparatus includes a discharge circuit that discharges a charge from the capacitor; a control circuit that controls at least one of frequency and amplitude of the inverter output voltage; a trigger circuit that outputs a discharge command signal for causing the discharge circuit to discharge the charge from the capacitor; a first voltage-sag detection circuit that detects a voltage sag in the alternate-current power system, and outputs a voltage-sag signal to the control circuit; a control power circuit that receives a power from the alternate-current power system and another alternate-current power system other than the alternate-current power system, and supplies a power to the control circuit; and a second voltage-sag detection circuit that detects a voltage sag in the control power circuit. When the second voltage-sag detection circuit detects a voltage sag of the control power circuit below a predetermined value, the trigger circuit generates the discharge command signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an inverter apparatus according to the present invention will be explained below in detail with reference to the accompanying drawings. However, the present invention is not limited to the embodiments described below.

First Embodiment

Figure 1:
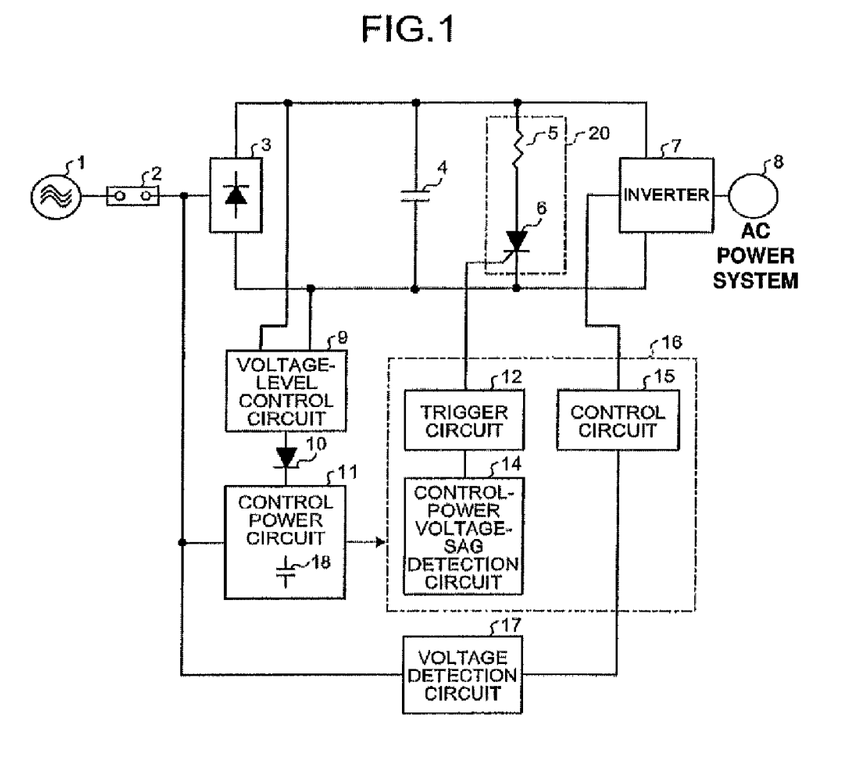
FIG. 1 is a schematic diagram of an inverter apparatus according to a first embodiment of the present invention.
Figure 2:
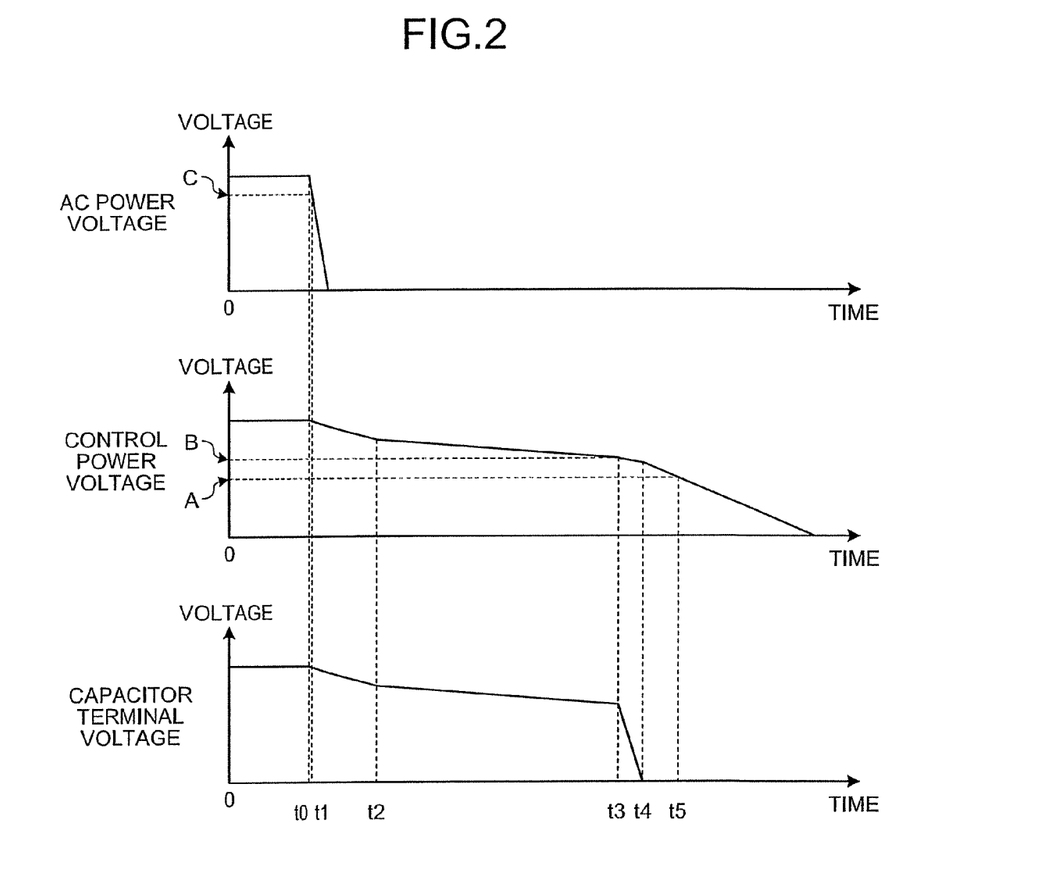
FIG. 2 is temporal transition diagrams of voltages of respective units of the inverter apparatus shown in FIG. 1.

An inverter apparatus according to a first embodiment of the present invention is explained below with reference to FIGS. 1 and 2. FIG. 1 is a schematic diagram of the inverter apparatus according to the first embodiment. FIG. 2 is temporal transition diagrams of voltages of respective units of the inverter apparatus shown in FIG. 1.

As shown in FIG. 1, the inverter apparatus according to the first embodiment includes a rectifier circuit 3, a capacitor 4, a discharge circuit 20, an inverter 7, a voltage-level control circuit 9, a reverse-current protection diode 10, and a control power circuit 11 as components of a main circuit/power supply system, and a control device 16 and a voltage detection circuit 17 as components of a control system. The inverter apparatus is configured such that the rectifier circuit 3 arranged at an input end is connected to a first alternate-current power system 1 via a switching device 2, and the inverter 7 arranged at an output end is connected to a second alternate-current power system 8. The control device 16 includes a control circuit 15, a trigger circuit 12, and a control-power voltage-sag detection circuit 14; the discharge circuit 20 includes a resistance 5 and a switching device 6 such as a thyristor, and forms a serial circuit; and the serial circuit is connected to the capacitor (smoothing capacitor) 4 in parallel.

Operation of the inverter apparatus according to the first embodiment is explained below. It is explained below by using one phase from three-phase alternate-current.

The rectifier circuit 3 is supplied with alternate-current power from the first alternate-current power system 1, for example, which is a three-phase alternate-current power supply, via the switching device 2. The rectifier circuit 3 converts alternate-current power into direct-current power, and charges the capacitor 4. The inverter 7 connected in parallel to the capacitor 4 and the discharge circuit 20 converts direct-current power of the capacitor 4 into alternate-current power, and then supplies the converted alternate-current power to the second alternate-current power system 8.

The voltage-level control circuit 9 controls an output voltage of the rectifier circuit 3 to be a predetermined direct-current voltage. The control power circuit 11 receives alternate-current power from the first alternate-current power system 1, receives direct-current power from the capacitor 4 via the voltage-level control circuit 9 and the reverse-current protection diode 10, and supplies power to the control device 16.

The control-power voltage-sag detection circuit 14 detects an event that the voltage of the control power circuit 11

(hereinafter, "control power voltage") reaches a threshold B (see FIG. 2) or lower that is set to a value higher than a value A (see FIG. 2) at which the control device 16 becomes inoperative. When the control-power voltage-sag detection circuit 14 detects a voltage sag in the control power voltage, the control device 16 outputs a discharge command signal to the switching device 6 of the discharge circuit 20 via the trigger circuit 12.

When the voltage detection circuit 17 detects an event that the voltage of the first alternate-current power system 1 becomes lower than a predetermined reference value C (see FIG. 2), the voltage detection circuit 17 outputs a voltage-sag signal to the control circuit 15. Upon receiving input of a voltage-sag signal, the control circuit 15 stops switching operation of the inverter 7.

Operation of the inverter apparatus according to the first embodiment when the first alternate-current power system 1 is broken is explained below.

When the voltage of the first alternate-current power system 1 starts to decrease (time t0 in FIG. 2), the voltage detection circuit 17 detects an event that the voltage of the first alternate-current power system 1 becomes lower than the predetermined reference value C, and outputs a voltage-sag signal to the control circuit 15 (time t1 in FIG. 2).

Upon receiving input of a voltage-sag signal, the control circuit 15 stops switching operation of the inverter 7 (time t2 in FIG. 2). When the switching operation is stopped, output power to the second alternate-current power system 8 turns to substantially zero, and the voltage of the capacitor 4 is used only in power consumption in the control device 16, so that a terminal voltage of the capacitor 4 after the stop time of the inverter 7 (time t2 in FIG. 2) is kept at a substantially constant value. It can be easily achieved that after the stop time of the inverter 7, the control power voltage is set to a level at which the control device 16 is operatable, by appropriately selecting a capacitance of the capacitor 4.

The terminal voltage of the capacitor 4 after the inverter 7 is stopped gradually decreases due to power consumption by the control device 16, correspondingly, the control power voltage also decreases. The control power voltage slowly decreases at an attenuation constant rate determined by a charge storage element 18 included in the control power circuit 11 and a load on the control device 16. For this reason, during a period in which the control power voltage is kept at a level at which the control device 16 is operatable, the control device 16 can maintain the inverter 7 in a stop state. In other words, while the control device 16 maintains the inverter 7 in a stop state, even if a terminal voltage of the capacitor 4 is being applied to the inverter 7, an overcurrent based on the charge stored in the capacitor 4 does not pass through switching elements of the inverter 7, therefore, the capacitor 4 does not need to be discharged.

Accordingly, when a voltage sag occurs for tens milliseconds to hundreds milliseconds (hereinafter, "a mini power failure"), a decrease in the terminal voltage of the capacitor 4 during the mini power failure is small. To secure operation reliability, a prompt restart of operation after elimination of trouble is often required to an inverter apparatus for electric power. When recovering from a mini power failure, the terminal voltage of the capacitor 4 rapidly increases to a specified value, the inverter apparatus can be restarted quickly without performing special operation, such as recharging the capacitor 4.

Compared with this, when a system-voltage sag or the like occurs, a conventional inverter apparatus controls and causes a capacitor to discharge and not to pass an overcurrent through switching elements. Consequently, the capacitor has to be recharged each time when restarting the inverter apparatus, and a restart of the inverter apparatus requires a time.

By contrast, according to the inverter apparatus according to the first embodiment, when a long power failure occurs, the control power voltage decreases gradually; and when the control-power voltage-sag detection circuit 14 detects an event that the control power voltage decreases to the threshold B in FIG. 2 or lower (time t3 in FIG. 2), the control-power voltage-sag detection circuit 14 outputs a discharge command signal to the switching device 6 of the discharge circuit 20 via the trigger circuit 12. As a result of the control in this way, the charge stored in the capacitor 4 is quickly discharged by the discharge circuit 20, so that the terminal voltage of the capacitor 4 rapidly decreases. When the charge in the capacitor 4 is discharged (time t4 in FIG. 2), the control power voltage decreases at an attenuation constant rate determined by the charge storage element 18 included in the control power circuit 11 and a load on the control device 16. When the control power voltage further decreases, and reaches the value A in FIG. 2 or lower at which the control device 16 is inoperative (time t5 in FIG. 2), the charge in the capacitor 4 has been discharged to a level at substantially zero, so that an overcurrent can be prevented from passing through the switching elements.

As described above, according to the inverter apparatus according to the first embodiment, the inverter apparatus is configured to supply power from the first alternate-current power system to the second alternate-current power system, and the control device included in the inverter apparatus does not cause the capacitor to discharge until the voltage of the control power circuit that supplies power to the control device by receiving power from the first alternate-current power system decreases to a predetermined value; so that the control power voltage is kept at a voltage at which the control device is operatable, and the charge is not discharged from the capacitor. According to the control in this way, a discharge requirement to the capacitor can be set to discharge only upon a long power failure. In other words, when a voltage sag occurs for tens milliseconds to hundreds milliseconds, the terminal voltage of the capacitor is substantially conserved. As a result, when recovering from such mini power failure, a special time for charging the capacitor is not required, so that a restarting time of the inverter apparatus can be reduced.

Second Embodiment

According to the inverter apparatus according to the first embodiment, the control power circuit is configured to receive alternate-current power from the first alternate-current power system as well as to receive direct-current power from the capacitor via the voltage-level control circuit and the reverse-current protection diode, and then to supply power to the control device. According to an inverter apparatus according to a second embodiment of the present invention, the control power circuit receives only alternate-current power from the first alternate-current power system, and then supplies power to the control device. Precisely, a difference between the first embodiment and the second embodiment lies in a power supply method to the control power circuit. The inverter apparatus according to the second embodiment is explained below in detail with reference to the drawings.

Figure 3:
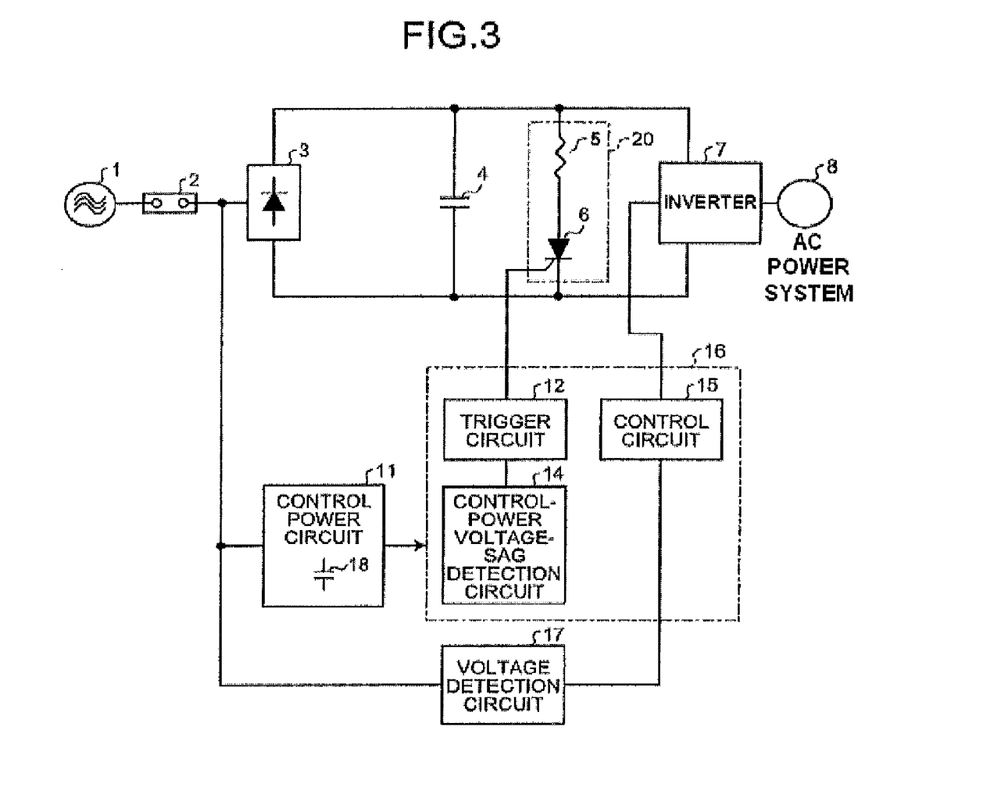
FIG. 3 is a schematic diagram of an inverter apparatus according to a second embodiment of the present invention.
Figure 4:
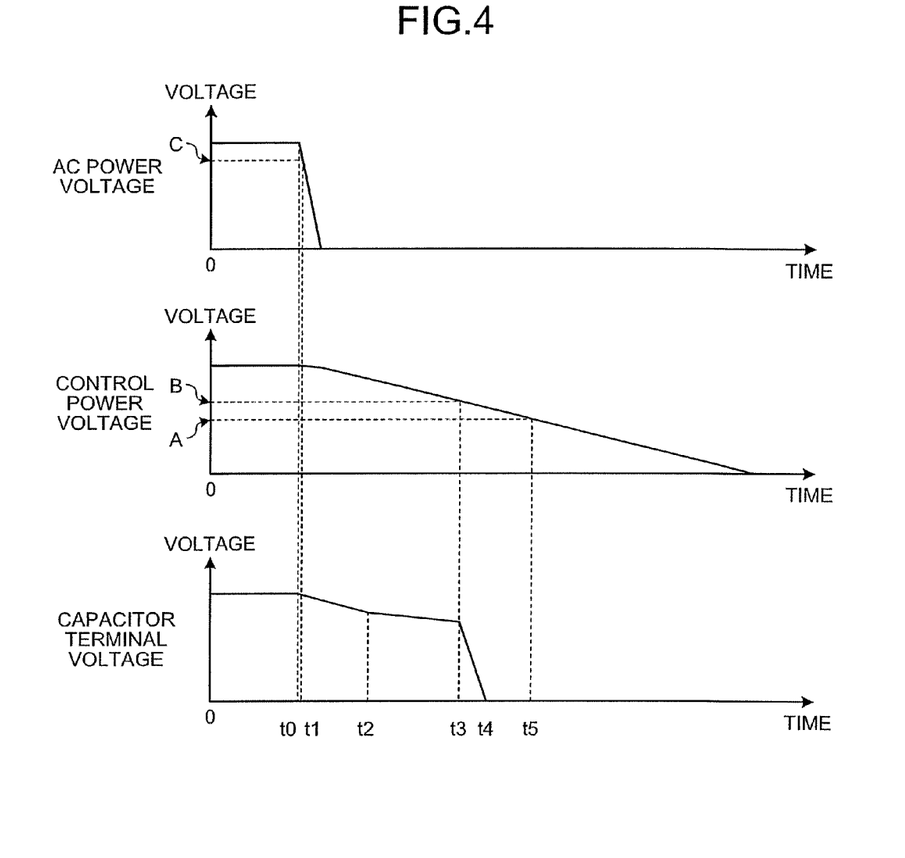
FIG. 4 is temporal transition diagrams of voltages of respective units of the inverter apparatus shown in FIG. 3.

FIG. 3 is a schematic diagram of the inverter apparatus according to the second embodiment. FIG. 4 is temporal transition diagrams of voltages of respective units of the inverter apparatus shown in FIG. 3. As shown in FIG. 3, according to the second embodiment, the voltage-level control circuit 9 and the reverse-current protection diode 10 are removed from the configuration shown in FIG. 1 according to the first embodiment. A component that is the same as or equivalent to that of the first embodiment is assigned with the same reference numeral, and the explanation of it is omitted.

As shown in FIG. 3, the control power circuit 11 includes the charge storage element 18 for smoothing an output voltage. An attenuation constant rate is set by selecting a capacitance of the charge storage element 18 so that a period from an occurrence of the system-voltage sag or the like until the control power voltage reaches the threshold B or lower (a period from time t0 to time t3 in FIG. 4) is equal to or longer than a recovery time (from tens milliseconds to hundreds milliseconds) from a mini power failure. As it is set in this way, discharge of the capacitor 4 is not performed upon a mini power failure, and the capacitor 4 does not need to be recharged.

As described above, according to the inverter apparatus according to the second embodiment, by setting an attenuation constant rate by selecting a capacitance of the charge storage element so that a period from an occurrence of a system-voltage sag or the like until the control power voltage reaches the threshold or lower is equal to or longer than a recovery time from a mini power failure, the inverter apparatus can be quickly restarted without recharging the capacitor at the occurrence of the mini power failure, even with a configuration such that the control power circuit is supplied with only alternate-current power from the first alternate-current power system and no direct-current power from the capacitor.

Third Embodiment

According to the inverter apparatus according to the second embodiment, the control power circuit is configured to receive alternate-current power from the first alternate-current power system, and then to supply power to the control device. According to an inverter apparatus according to a third embodiment of the present invention, the control power circuit receives alternate-current power from a separate alternate-current system different from the first alternate-current power system, and then supplies power to the control device. Precisely, a difference to the third embodiment from the first embodiment and the second embodiment lies in a power supply method to the control power circuit, similarly to the case of the second embodiment. The inverter apparatus according to the third embodiment is explained below in detail with reference to the drawings.

Figure 5:
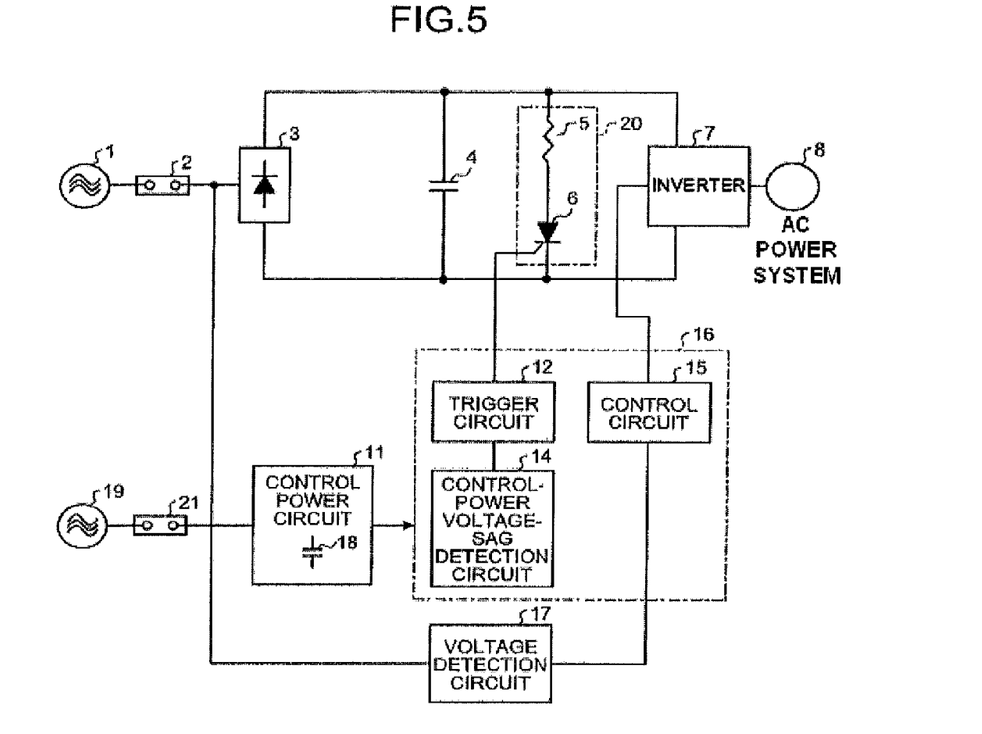
FIG. 5 is a schematic diagram of an inverter apparatus according to a third embodiment of the present invention.

FIG. 5 is a schematic diagram of the inverter apparatus according to the third embodiment. As shown in FIG. 5, according to the third embodiment, the control power circuit is configured to supply power from a separate alternate-current power system 19 different from the first alternate-current power system 1 via a switching device 21 to the control power circuit 11. A component that is the same as or equivalent to that of the first embodiment and the second embodiment is assigned with the same reference numeral, and the explanation of it is omitted.

The inverter apparatus according to the third embodiment can secure the control power voltage with power supplied from the separate alternate-current power system 19 different from the first alternate-current power system 1 even when a system-voltage sag or the like occurs in the first alternate-current power system 1.

As described above, according to the inverter apparatus according to the third embodiment, even when a long power failure occurs in the first alternate-current power system, discharge of the capacitor can be avoided, so that a restarting time can be reduced regardless of a time of a power failure in the first alternate-current power system.

Fourth Embodiment

According to the first to third embodiments, explained above is a configuration that power is supplied from the first alternate-current power system via the inverter apparatus to the second alternate-current power system. According to a fourth embodiment of the present invention, explained below is a configuration when an inverter connected to a capacitor controls a direct-current voltage of the capacitor in a predetermined direct-current voltage range, and then supplies a reactive power to an alternate-current power system.

Figure 6:
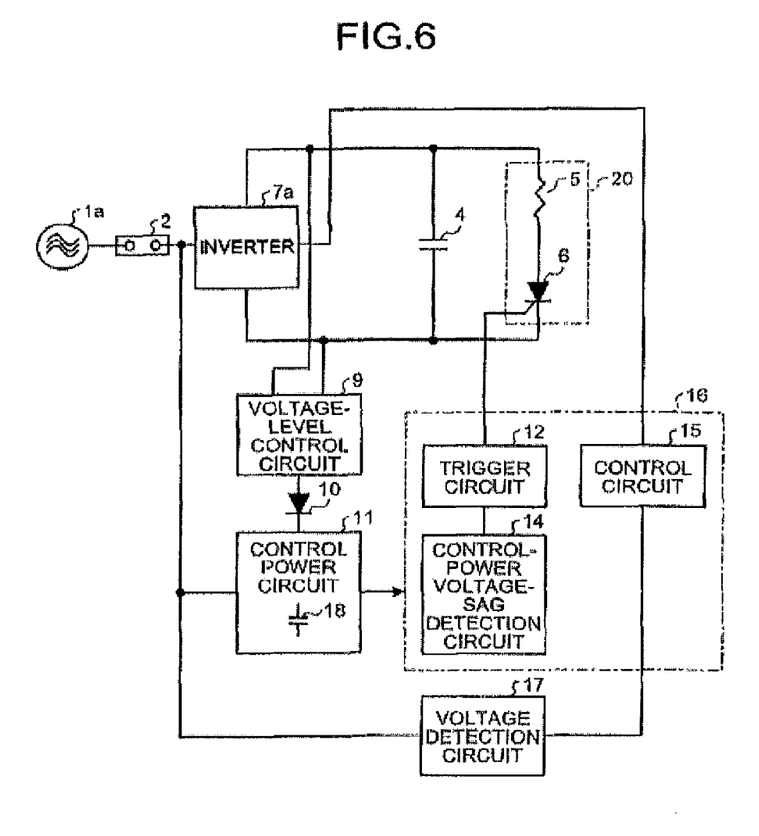
FIG. 6 is a schematic diagram of an inverter apparatus according to a fourth embodiment of the present invention.

FIG. 6 is a schematic diagram of the inverter apparatus according to the fourth embodiment. Temporal transitions of voltages of respective units of the inverter apparatus are similar to those in FIG. 2 explained in the first embodiment. A component that is equivalent to or the same as that of the first embodiment is assigned with the same reference numeral, and the explanation of it is omitted.

The inverter apparatus shown in FIG. 6 is configured such that an inverter is connected to an alternate-current power system 1a. The inverter can generate leading/lagging reactive power depending on a magnitude relation between an output voltage of the inverter and a system voltage of the alternate-current power system 1a, and can compensate reactive power lacked in the system side, and is generally called a static synchronous compensator (STATCOM). The alternate-current power system 1a supplies power to the inverter apparatus, and then an inverter 7a charges the capacitor 4; while a control signal for compensating reactive power in the alternate-current power system 1a is input to the inverter 7a, power stored in the capacitor 4 is used, and then the reactive power is supplied to the alternate-current power system 1a.

Operation of relevant units of the inverter apparatus according to the fourth embodiment is explained below. It is explained below by using one phase from three-phase alternate-current.

Similarly to the inverter apparatus shown in FIG. 1 explained according to the first embodiment, also according to the inverter apparatus shown in FIG. 6, a decrease in the terminal voltage of the capacitor 4 caused by a mini power failure is small. On the other hand, when recovering from the mini power failure, the voltage of the capacitor 4 rapidly increases up to a specified value, so that the inverter apparatus can be quickly restarted without performing special operation such as recharging the capacitor 4.

When a long power failure occurs, the control-power voltage-sag detection circuit 14 detects an event that the control power voltage reaches the threshold B or lower, and causes the capacitor 4 to discharge its charge. When the control power voltage reaches the value A or lower at which the control device 16 is inoperative (time t5 in FIG. 2), the charge in the capacitor 4 has been discharged to a level at substantially zero, so that an overcurrent can be prevented from passing through the switching elements.

As described above, according to the inverter apparatus according to the fourth embodiment, the inverter apparatus is configured such that the inverter connected to the capacitor converts a direct-current based on the charge stored in the capacitor into an alternate-current, and supplies a reactive power to the alternate-current power system, and the control device included in the inverter apparatus does not cause the capacitor to discharge until the voltage of the control power circuit that supplies power to the control device by receiving power from the first alternate-current power system decreases to a predetermined value; so that the control power voltage is kept at a voltage at which the control device is operatable, and the charge is not discharged from the capacitor. According to the control in this way, a discharge requirement to the capacitor can be set to discharge only upon a long power failure. In other words, when a voltage sag occurs for tens milliseconds to hundreds milliseconds, the terminal voltage of the capacitor is substantially conserved. As a result, when recovering from such mini power failure, a special time for charging the capacitor is not required, so that a restarting time of the inverter apparatus can be reduced.

Fifth Embodiment

According to the inverter apparatus according to the fourth embodiment, similarly to the first embodiment, the control power circuit is configured to receive alternate-current power from the alternate-current power system as well as to receive direct-current power from the capacitor via the voltage-level control circuit and the reverse-current protection diode, and then to supply power to the control device. According to an inverter apparatus according to a fifth embodiment of the present invention, similarly to the second embodiment, the control power circuit receives only alternate-current power from an alternate-current power system, and then supplies power to the control device. Precisely, a difference between the fourth embodiment and the fifth embodiment lies in a power supply method to the control power circuit. The inverter apparatus according to the fifth embodiment is explained below in detail with reference to the drawings.

Figure 7:
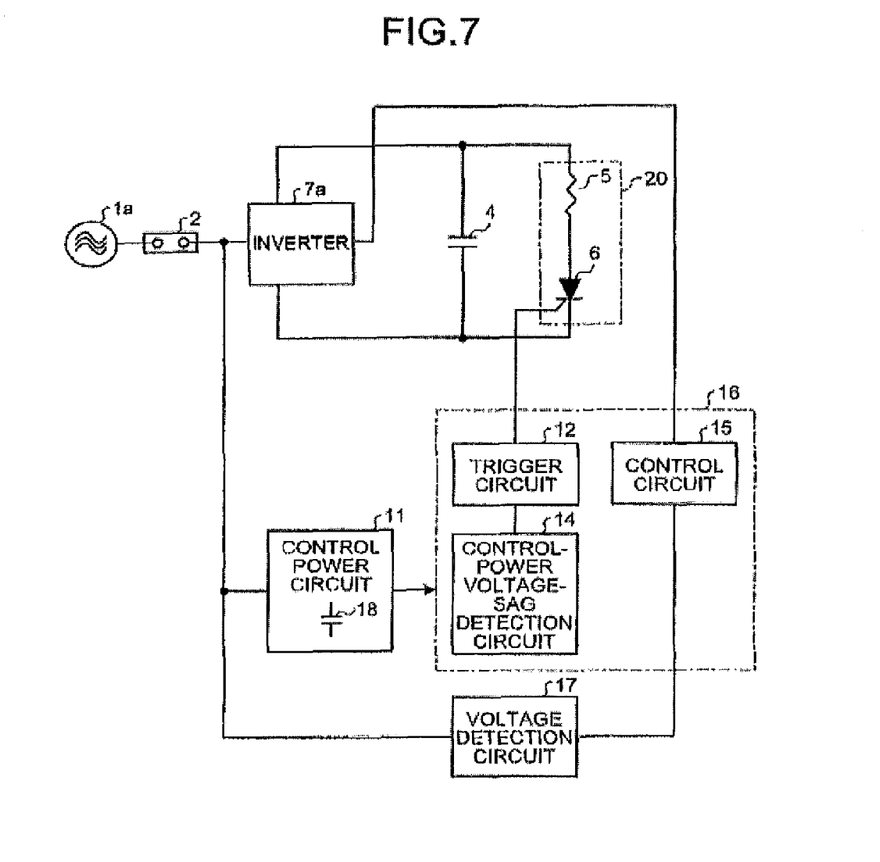
FIG. 7 is a schematic diagram of an inverter apparatus according to a fifth embodiment of the present invention.

FIG. 7 is a schematic diagram of the inverter apparatus according to the fifth embodiment. Temporal transitions of voltages of respective units of the inverter apparatus are similar to those in FIG. 4 explained in the second embodiment. As shown in FIG. 7, according to the fifth embodiment, the voltage-level control circuit 9 and the reverse-current protection diode 10 are removed from the configuration shown in FIG. 6 according to the fourth embodiment. A component that is the same as or equivalent to that of the fourth embodiment is assigned with the same reference numeral, and the explanation of it is omitted.

As shown in FIG. 7, the control power circuit 11 includes the charge storage element 18 for smoothing an output voltage. An attenuation constant rate is set by selecting a capacitance of the charge storage element 18 so that a period from an occurrence of a system-voltage sag or the like until the control power voltage reaches the threshold B or lower (a period from time t0 to time t3 in FIG. 4) is equal to or longer than a recovery time (from tens milliseconds to hundreds milliseconds) from a mini power failure. As it is set in this way, discharge of the capacitor 4 is not performed upon a mini power failure, and the capacitor 4 does not need to be recharged.

As described above, according to the inverter apparatus according to the fifth embodiment, by setting an attenuation constant rate by selecting a capacitance of the charge storage element so that a period from an occurrence of a system-voltage sag or the like until the control power voltage reaches the threshold or lower is equal to or longer than a recovery time from a mini power failure, the inverter apparatus can be quickly restarted without recharging the capacitor at the occurrence of the mini power failure, even with a configuration such that the control power circuit is supplied with only alternate-current power from the alternate-current power system and no direct-current power from the capacitor.

Sixth Embodiment

According to the inverter apparatus according to the fifth embodiment, similarly to the second embodiment, the control power circuit is configured to receive alternate-current power from the alternate-current power system that supplies power to the main circuit system, and then to supplies power to the control device. According to an inverter apparatus according to a sixth embodiment of the present invention, similarly to the third embodiment, the control power circuit receives alternate-current power from a separate alternate-current system different from the alternate-current power system that supplies power to the main circuit system, and then supplies power to the control device. Precisely, a difference to the sixth embodiment from the fourth embodiment and the fifth embodiment lies in a power supply method to the control power circuit, similarly to the case of the fifth embodiment. The inverter apparatus according to the sixth embodiment is explained below in detail with reference to the drawings.

Figure 8:
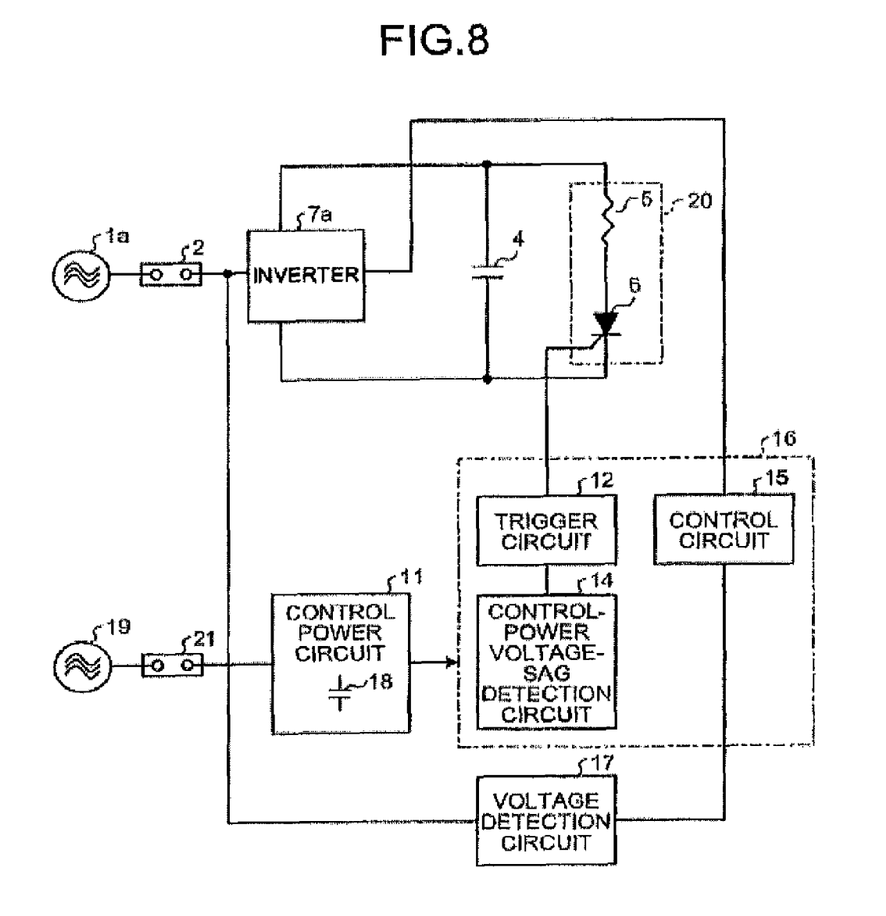
FIG. 8 is a schematic diagram of an inverter apparatus according to a sixth embodiment of the present invention.

FIG. 8 is a schematic diagram of the inverter apparatus according to the sixth embodiment. As shown in FIG. 8, according to the sixth embodiment, the control power circuit is configured to supply power to the control power circuit 11 via the switching device 21 from the separate alternate-current power system 19, which is different from the alternate-current power system 1a that supplies power to the main circuit system. A component that is the same as or equivalent to that of the fourth embodiment and the fifth embodiment is assigned with the same reference numeral, and the explanation of it is omitted.

The inverter apparatus according to the sixth embodiment can secure the control power voltage with power supplied from the separate alternate-current power system 19 different from the alternate-current power system 1a even when a system-voltage sag or the like occurs in the alternate-current power system 1a that supplies power to the main circuit system.

As described above, according to the inverter apparatus according to the sixth embodiment, even when a long power failure occurs in the alternate-current power system that supplies power to the main circuit system, discharge of the capacitor can be avoided, so that a restarting time can be reduced regardless of a time of a power failure in the alternate-current power system that supplies power to the main circuit system.

According to the inverter apparatuses according to the first to sixth embodiments, a system-voltage disturbance after the recovery of a system voltage can be suppressed because of a reduction in a restarting time of the inverter apparatus, consequently operation performance of the inverter apparatus can be improved.

Moreover, according to the inverter apparatuses according to the first to sixth embodiments, because discharge of the capacitor is not needed in a case of a mini power failure, the inverter apparatus can be quickly restarted when recovering from the mini power failure, and the operation rate of the apparatus can be improved.

According to the first to sixth embodiments, although explained above are cases in which discharge of the capacitor can be avoided, the capacitor is configured capable to discharge as required, for example, when performing a maintenance inspection.

Moreover, according to the first to sixth embodiments, although a three-phase alternate-current power supply is explained above as an example of an alternate-current power system; even when the alternate-current power system is a single-phase alternate-current power supply, similar effects can be obtained.

According to one aspect of the present invention, because the control device included in the inverter apparatus configured to supply power from the first alternate-current power system to the second alternate-current power system does not cause the capacitor to discharge until the voltage of the control power circuit that supplies power to the control device by receiving power from the first alternate-current power system decreases to a predetermined value, so that the control power voltage is kept at a voltage at which the control device is operatable, and the charge is not discharged from the capacitor. According to the control in this way, a discharge requirement to the capacitor can be set to discharge only upon a long power failure. In other words, when a voltage sag occurs for tens milliseconds to hundreds milliseconds, the terminal voltage of the capacitor is substantially conserved. As a result, when recovering from such mini power failure, a special time for charging the capacitor is not required, so that a restarting time of the inverter apparatus can be reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An inverter apparatus that converts a direct-current power of a capacitor that is charged via a rectifier circuit connected to a first alternate-current power system into an alternate-current power, and supplies the alternate-current power to a second alternate-current power system, the inverter apparatus comprising:
    a discharge circuit that discharges a charge from the capacitor;
    a control circuit that controls at least one of frequency and amplitude of the inverter output voltage;
    a trigger circuit that outputs a discharge command signal for causing the discharge circuit to discharge the charge from the capacitor;
    a first voltage-sag detection circuit that detects a voltage sag in the first alternate-current power system, and outputs a voltage-sag signal to the control circuit;
    a control power circuit that receives a power from either one of the first alternate-current power system and the capacitor, and supplies a power to the control circuit; and
    a second voltage-sag detection circuit that detects a voltage sag in the control power circuit, wherein
    when the second voltage-sag detection circuit detects a voltage sag of the control power circuit below a predetermined value, the trigger circuit generates the discharge command signal.

2. An inverter apparatus that converts a direct-current power of a capacitor that is charged via a rectifier circuit connected to a first alternate-current power system into an alternate-current power, and supplies the alternate-current power to a second alternate-current power system, the inverter apparatus comprising:
    a discharge circuit that discharges a charge from the capacitor;
    a control circuit that controls at least one of frequency and amplitude of the inverter output voltage;
    a trigger circuit that outputs a discharge command signal for causing the discharge circuit to discharge the charge from the capacitor;
    a first voltage-sag detection circuit that detects a voltage sag in the first alternate-current power system, and outputs a voltage-sag signal to the control circuit;
    a control power circuit that receives a power from the first alternate-current power system, and supplies a power to the control circuit; and
    a second voltage-sag detection circuit that detects a voltage sag in the control power circuit, wherein
    when the second voltage-sag detection circuit detects a voltage sag of the control power circuit below a predetermined value, the trigger circuit generates the discharge command signal.

3. An inverter apparatus that converts a direct-current of a capacitor that is charged via a rectifier circuit connected to a first alternate-current power system into an alternate-current power, and supplies the alternate-current power to a second alternate-current power system, the inverter apparatus comprising:
    a discharge circuit that discharges a charge from the capacitor;
    a control circuit that controls at least one of frequency and amplitude of the inverter output voltage;
    a trigger circuit that outputs a discharge command signal for causing the discharge circuit to discharge the charge from the capacitor;
    a first voltage-sag detection circuit that detects a voltage sag in the first alternate-current power system, and outputs a voltage-sag signal to the control circuit;
    a control power circuit that receives a power from the first alternate-current power system and an alternate-current power system other than the second alternate-current power system, and supplies a power to the control circuit; and
    a second voltage-sag detection circuit that detects a voltage sag in the control power circuit, wherein
    when the second voltage-sag detection circuit detects a voltage sag of the control power circuit below a predetermined value, the trigger circuit generates the discharge command signal.

4. An inverter apparatus that converts a direct-current power of a capacitor that is charged via an inverter functioning as a rectifier circuit connected to an alternate-current power system into an alternate-current power, and supplies the alternate-current power to the alternate-current power system, the inverter apparatus comprising:
    a discharge circuit that discharges a charge from the capacitor;
    a control circuit that controls at least one of frequency and amplitude of the inverter output voltage;
    a trigger circuit that outputs a discharge command signal for causing the discharge circuit to discharge the charge from the capacitor;
    a first voltage-sag detection circuit that detects a voltage sag in the alternate-current power system, and outputs a voltage-sag signal to the control circuit;
    a control power circuit that receives a power from either one of the alternate-current power system and the capacitor, and supplies a power to the control circuit; and
    a second voltage-sag detection circuit that detects a voltage sag in the control power circuit, wherein
    when the second voltage-sag detection circuit detects a voltage sag of the control power circuit below a predetermined value, the trigger circuit generates the discharge command signal.

5. An inverter apparatus that converts a direct-current power of a capacitor that is charged via an inverter functioning as a rectifier circuit connected to an alternate-current power system into an alternate-current power, and supplies the alternate-current power to the alternate-current power system, the inverter apparatus comprising:
    a discharge circuit that discharges a charge from the capacitor;
    a control circuit that controls at least one of frequency and amplitude of the inverter output voltage;
    a trigger circuit that outputs a discharge command signal for causing the discharge circuit to discharge the charge from the capacitor;

a first voltage-sag detection circuit that detects a voltage sag in the alternate-current power system, and outputs a voltage-sag signal to the control circuit;

a control power circuit that receives a power from the alternate-current power system, and supplies a power to the control circuit; and a second voltage-sag detection circuit that detects a voltage sag in the control power circuit, wherein when the second voltage-sag detection circuit detects a voltage sag of the control power circuit below a predetermined value, the trigger circuit generates the discharge command signal.

6. An inverter apparatus that converts a direct-current power of a capacitor that is charged via an inverter functioning as a rectifier circuit connected to an alternate-current power system into an alternate-current power, and supplies the alternate-current power to the alternate-current power system, the inverter apparatus comprising:

a discharge circuit that discharges a charge from the capacitor;

a control circuit that controls at least one of frequency and amplitude of the inverter output voltage;

a trigger circuit that outputs a discharge command signal for causing the discharge circuit to discharge the charge from the capacitor;

a first voltage-sag detection circuit that detects a voltage sag in the alternate-current power system, and outputs a voltage-sag signal to the control circuit;

a control power circuit that receives a power from the alternate-current power system and another alternate-current power system other than the alternate-current power system, and supplies a power to the control circuit; and a second voltage-sag detection circuit that detects a voltage sag in the control power circuit, wherein when the second voltage-sag detection circuit detects a voltage sag of the control power circuit below a predetermined value, the trigger circuit generates the discharge command signal.

\* \* \* \* \*